(12) United States Patent
Richter et al.

(10) Patent No.: US 8,791,810 B2
(45) Date of Patent: *Jul. 29, 2014

(54) OPTIMAL ELECTRIC VEHICLE BATTERY RECOMMENDATION SYSTEM

(71) Applicant: International Business Machines Corporation, Armonk, NY (US)

(72) Inventors: Jan Richter, Hawthorne (AU); Kent C. B. Steer, Brunswick (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,283

(22) Filed: Dec. 28, 2012

(65) Prior Publication Data

US 2014/0188304 A1  Jul. 3, 2014

Related U.S. Application Data

(63) Continuation of application No. 13/730,062, filed on Dec. 28, 2012.

(51) Int. Cl.
*B60Q 1/00* (2006.01)
(52) U.S. Cl.
USPC .................. 340/455; 340/439; 340/636.1

(58) Field of Classification Search
None
See application file for complete search history.

(56) References Cited

U.S. PATENT DOCUMENTS

| 6,177,879 | B1* | 1/2001 | Kokubu et al. ............... 340/5.4 |
| 7,933,695 | B2 | 4/2011 | Yamaguchi |
| 8,164,300 | B2 | 4/2012 | Agassi et al. |
| 8,457,821 | B2* | 6/2013 | Shaffer ........................ 701/22 |
| 2011/0071932 | A1 | 3/2011 | Agassi et al. |
| 2012/0248868 | A1 | 10/2012 | Mobin et al. |

* cited by examiner

*Primary Examiner* — Travis Hunnings
(74) *Attorney, Agent, or Firm* — Cantor Colburn LLP; Louis Percello

(57) ABSTRACT

An optimal vehicle battery recommendation system includes at least one sensor to detect a manipulation of the vehicle. A driver behavior module determines a driving behavior of a driver of the vehicle. A vehicle consumption module determines battery information of an on-board battery currently connected to the vehicle, and determines energy consumption of the vehicle. A battery capacity advisor module is in electrical communication with the driver behavior module and the vehicle consumption module. The battery capacity module determines a replacement battery option that changes at least one battery characteristic of the on-board battery based on the driver behavior model and the vehicle consumption model.

18 Claims, 2 Drawing Sheets

OPTIMAL ELECTRIC VEHICLE BATTERY RECOMMENDATION SYSTEM

CROSS-REFERENCE TO RELATED APPLICATION

This application is a continuation of U.S. patent application Ser. No. 13/730,062, filed Dec. 28, 2012, the disclosure of which is incorporated by reference herein in its entirety.

BACKGROUND

The present invention relates generally to electric vehicles, and more specifically, to a battery recommendation system of an electric vehicle.

The development of electric vehicles has gained interest due to an increased awareness in environment protection, fuel conservation, and energy independency. The range of an electric vehicle, i.e., the distance the vehicle can travel between charges, depends on, among other things, the weight of the vehicle. However, the weight of the typical vehicle battery is a large portion of the overall vehicle weight. Every additional kilogram of the battery is additional weight that affects the energy consumption of the vehicle. Consequently, the range of a vehicle does not necessarily increase linearly with the size or the weight of the battery. That is, doubling the size or weight of the battery does not necessarily double the range of the vehicle.

Some examples of electrical vehicles are the Mitsubishi i-MiEV, the Tesla Roadster, the Renault Fluence, and the Nissan Leaf. The Mitsubishi i-MiEV uses a 16 kilowatt hour (kWh) Li-ion battery, has a total weight of 1080 kilograms (kg) (without passengers) and can travel around 100 kilometers (km) based on the United States Environmental Protection Agency (EPA) cycle, which is a standard for U.S. driving patterns. The efficiency of a vehicle battery may be measured according to the specific energy. Specific energy is defined as the energy per unit mass (e.g., Wh/kg). Accordingly, the battery of the Mitsubishi i-MiEV has a specific energy of 80 watt-hours per kilogram (Wh/kg) and thus weighs around 200 kg. The Tesla Roadster has a 53 kWh Li-ion battery, weighs 1235 kg and can travel 393 km on one charge (based on U.S. EPA combined cycle). The Renault Fluence Z.E.: 24 kWh Li-ion, 1543 kg, 185 km per charge, which is based on the New European Driving Cycle (NEDC) combined cycle. Nissan Leaf: 24 kWh Li-ion, 1521 kg, 175 km per charge (based on the NEDC combined cycle).

Batteries of electric vehicles are presently selected by vehicle manufacturers to alleviate range anxiety and are sized to meet peak range expectations. That is, vehicle manufactures select or recommend batteries which exceed the everyday requirements of most drivers in order to inhibit occurrences where a driver will run out of energy at locations lacking nearby battery recharging stations. Accordingly, electric vehicles are designed with batteries that maximize the size of their market. For instance, vehicle manufactures ideally prefer to satisfy a wide range of typical driving distances, i.e., drivers that typically drive 10 km per day and also drivers that typically drive 100 km per day. The conventional battery selection model, however, results in inefficient use of the vehicle battery and unnecessarily increases the overall weight of the vehicle. Consequently, vehicles are typically installed with batteries providing suboptimal energy storage capacity.

SUMMARY

According to one embodiment, an optimal vehicle battery recommendation system includes at least one sensor to detect a manipulation of the vehicle. A driver behavior module determines a driving behavior of a driver of the vehicle. A vehicle consumption module determines battery information of an on-board battery connected to the vehicle. The vehicle consumption module determines at least one battery characteristic among a first set of battery characteristics and determines energy consumption of the vehicle. A battery capacity advisor module is in electrical communication with the driver behavior module and the vehicle consumption module. The battery capacity module is configured to determine a replacement battery option that changes at least one battery characteristic among the first set of battery characteristics based on the driver behavior model and the vehicle consumption model.

According to another embodiment, a system to optimize an on-board battery of a vehicle comprises a user interface configured to receive at least one driver profile corresponding to a driver of the vehicle. A driver behavior module is configured to determine dynamic vehicle data in response to operation of the vehicle by the driver. The driver behavior module further stores the dynamic vehicle data corresponding to the driver profile. A vehicle consumption module is configured to determine battery information of an on-board battery currently connected to the vehicle. The on-board battery has a first set of including, but not limited, to specific energy, weight, energy storage capacity, charging rate, and one or more temperature requirements. One or more of the first set of characteristics may be determined by the vehicle consumption module. The vehicle consumption module further determines energy consumption of the vehicle. The system further includes a battery capacity advisor module in electrical communication with the driver behavior module, the vehicle consumption module, and the user interface. The battery capacity module is configured to determine a replacement battery option that modifies at least one characteristic among the first set of characteristics on the dynamic vehicle data of the input driver profile and the energy consumption of the vehicle.

In another embodiment, a method of determining an optimal battery for an electric vehicle comprises detecting a manipulation of the vehicle, and determining a driving behavior of a driver of the vehicle based on the manipulation. The method further includes determining battery information of an on-board battery currently connected to the vehicle. The method further includes determining at least one characteristic of the on-board battery among a first set of characteristics. The first set of characteristics includes specific energy, weight, energy storage capacity, charging rate, and one or more temperature requirements. One or more of the first set of characteristics may be determined by the vehicle consumption module. The method further includes determining energy consumption of the vehicle, and determining a replacement battery option that changes at least one characteristic among the first set of characteristics based on the driver behavior model and the vehicle consumption.

In yet another embodiment, a method of determining an optimal battery for a vehicle comprises receiving at least one driver profile corresponding to a driver of the vehicle, and determining dynamic vehicle data in response to operation of the vehicle according to the driver. The method further includes storing the dynamic vehicle data corresponding to the driver profile, and determining battery information of an on-board battery connected to the vehicle. The battery has a first set of characteristics including specific energy, weight, energy storage capacity, charging rate, and one or more temperature requirements. The method further includes determining one or more of the first set of characteristics, and determining energy consumption of the vehicle. The method further includes determining a replacement battery option that modifies at least one characteristic among the first set of characteristics based on the dynamic vehicle data of the input driver profile and the energy consumption of the vehicle.

Additional features are realized through the techniques of the various embodiments. Other embodiments are described in detail herein and are considered a part of the claimed invention. For a better understanding of the invention and the related features, the following detailed description and corresponding drawings are provided.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
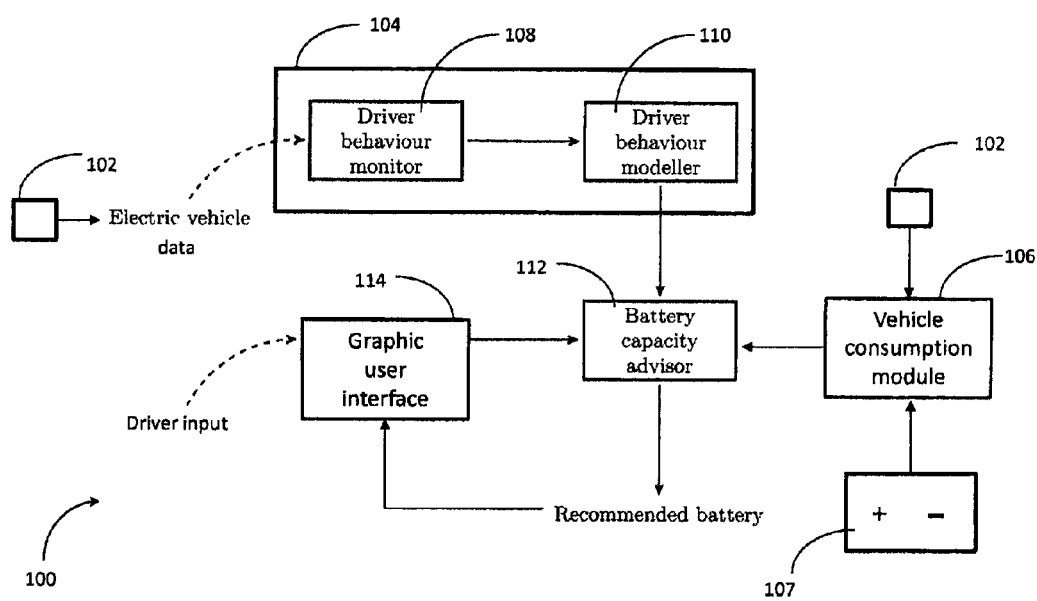
FIG. 1 illustrates an optimal vehicle battery recommendation system to determine an optimal battery to power an electric vehicle according to an embodiment.

At least one embodiment provides a vehicle battery optimizing replacement system 100 that determines an optimal battery to power a motor of an electric vehicle. The optimal battery includes a battery option that meets one or more driver requirements while adding the least amount of weight. The driver requirements may include, but is not limited to, the cost of the battery, the driving range and operating time of the battery and the power range output by the battery. In at least one embodiment, the optimal battery provides the electric vehicle with the most power while adding the least amount of weight.

The electric vehicle may include a power electronics module that controls an amount of power from the battery necessary to drive the motor. In addition to driving the motor, the power electronics module draws power from the battery to drive various sub-systems of the vehicle including, but not limited to, the heating ventilation/air condition (HVAC) system, the radio/media system, the wireless communication system, and the windshield wiper system. The power electronics module converts direct current (DC) power provided by the battery to alternating current (AC) power, and delivers the AC power to the motor, which generates the necessary torque to drive the electric vehicle at a corresponding speed. A position of an accelerator pedal, which is adjusted by the driver of the vehicle, indicates the driver's desire for increased or decreased speed. Accordingly, the battery may provide the power to generate the necessary torque for driving the vehicle at the speed desired by the driver.

The motor of an electric vehicle may operate differently according to range of power provided by the battery. A conventional motor weighing about 50 pounds (lbs), for example, may operate in response to voltage ranging, for example, from 72 volts (V) to 120V. At the lower range of 72 V, the continuous rating of the battery is about 12.1 kilowatts (kW), which generates about 16.0 horsepower (hp). The peak output of the motor at 72 V is about 31.5 kW, which generates about 42.0 hp. At a second power, for example 96V, the continuous rating is increased to about 14.4 kW, which provides about 19.0 hp. The peak output of the motor at 96 V is about 51.0 kW and the motor generates about 68.0 hp. At the higher range of 120 V, the continuous rating is increased further to about 16.3 kW which provides about 21.7 hp. The peak output of the motor at 120 V is about 62.0 kW and the horsepower is about 83.0 hp. Therefore, the electric vehicle may operate at different voltages allowing for the replacement of batteries that provide different voltages and/or the modification of battery layers that generate different voltages.

The optimal battery used to power the motor of the electric vehicle may include a replaceable battery unit that provides a predetermined specific energy realized by the vehicle. Specific energy is defined as the energy per unit mass. For example, the specific energy of a battery may be measured in terms of watt-hours per kilograms (Wh/kg), and may be used to identify the overall energy efficiency with respect to the weight of the battery. That is, by decreasing the weight of the battery, while still providing the power necessary to power the motor may be deemed as increasing the specific energy realized by the vehicle. The optimal battery may also include a layered battery unit, which allows one or more battery layers to be electrically connected or disconnected from the battery. As more battery layers are added, the amount of available energy of the battery may be increased, while the weight of the battery unit is increased. As battery layers are removed, however, the amount of available energy is decreased and the weight of the battery is decreased. The battery unit may be optimized, i.e., more efficient, by removing battery layers to reduce the weight, while still providing the power necessary to drive the vehicle motor. Accordingly, a driver may consider sacrificing peak power performance to reduce the overall weight of the battery unit, thereby improving energy consumption of the overall vehicle.

Referring now to FIG. 1, a vehicle battery recommendation system 100 that determines an optimal battery to power a motor of an electric vehicle is illustrated. The vehicle battery recommendation system 100 includes one or more sensors 102, a driver behavior module 104, and a vehicle consumption module 106. The sensors 102 detect real time manipulation of the vehicle by a driver. For example, the sensors 102 may detect a vehicle accelerator input position, a vehicle breaking input, and vehicle steering input. The sensors 102 may also include a global positioning satellite (GPS) sensor that determines a real time geographical location of the vehicle.

The driver behavior module 104 is configured to determine a driving behavior of a driver a vehicle. The driver behavior module 104 includes a driver behavior monitor module 108 and a driver behavior modeller module 110. The driver behavior monitor module 108 is in electrical communication with one or more of the sensors 102 to determine dynamic vehicle data in response to the real time manipulation of the vehicle. The dynamic vehicle data includes, but is not limited to, a trip duration, a trip distance, an average vehicle speed during the driving duration, vehicle acceleration, and a total number of vehicle breaking inputs during the driving duration.

The driver behavior modeller module 110 is configured to store the dynamic vehicle data. Based on the dynamic vehicle data, the driver behavior modeller module 110 generates a numerical model indicating a driving behavior of the driver. The driver behavior modeller module 110 may also determine at least one driving preference of the driver. For example, the driver behavior modeller module 110 may determine that the driver initiates the HVAC sub-system at particular times during a typical driving route, i.e., to and/or from work, and may generate a driver behavior model taking into account the driver's use of the HVAC sub-system at particular times during a typical driving route. Based on the stored dynamic vehicle data, the driver behavior modeler module 110 may dynamically learn the driving behavior of the driver over a duration of time. For example, the driver behavior modeller module 110 may determine a particular driving trip as a driver's work route based on the frequency of the trip and the time of day the trip occurs. The driver behavior modeller module 110 may also categorize driving routes based on the dynamic data of the vehicle, e.g., the average speed, the breaking frequency, and the accelerations. For example, the driver behavior modeller module 110 may determine that the driver is diving on a highway in response to detecting a high speed (e.g., 55 mph), a relatively constant speed (i.e., average speed), minimal breaking patterns and/or minimal accelerations. On the contrary the driver behavior modeller module 110 may determine the driver is driving in the inner city in response to detecting a low speed (25 mph), frequency speed changes, frequent breaking, and frequent accelerations. The driver behavior modeller module 110 may generate a plurality route categories including, but not limited to, inner city driving, inner suburb driving, outer suburb driving, highway driving and countryside driving. Data from a GPS sensor may also be used to categorize the driving route.

The vehicle consumption module 106 is configured to determine on-board battery information, i.e., at least one battery characteristic, of an on-board battery 107 currently connected to the vehicle. The battery information/battery characteristics includes, but is not limited to, energy storage capacity (kWh), specific energy (Wh/kg), energy density (watt-hours per volume), discharge properties (e.g., amperes, voltage, power), recharge properties (e.g., amperes, voltage, power, control circuit requirements, battery materials, temperature requirements (e.g., cold climate batteries, hot climate batteries, total available power output of the on-board battery, voltage and current output values of the on-board battery, and the manufacturer of the on-board battery. In addition, the vehicle consumption module 106 may be in electrical communication with one or more sensors to determine an energy consumption model of the vehicle. The sensor may include the sensors 102 that detect the dynamic vehicle data and/or may include additional sensors that detect predetermined specifications of the vehicle. The vehicle specifications may also include motor information of the electric motor installed on the vehicle. The motor information may include, but is not limited to, the type of motor, the motor manufacturer, operating voltage ranges, continuous motor output ratings, and horsepower output, and peak output ratings. The vehicle consumption model module 106 may determine different continuous and peak output conditions of the motor based on the on-board battery currently installed on the vehicle.

The energy consumption model may be based on the dynamic vehicle data and the predetermined specifications of the vehicle. As mentioned above, the dynamic vehicle data includes, but is not limited to, a trip duration, a trip distance, an average vehicle speed during the driving duration, vehicle acceleration, and a total number of vehicle breaking inputs during the driving duration. The predetermined specifications include energy consumption used in response to powering the vehicle motor and the various sub-systems of the vehicle. The sub-systems of the vehicle include, but are not limited to, the HVAC system, the radio/media system, the wireless communication system, and the windshield wiper system. The dynamic vehicle data may also determine an energy consumption of a convertible vehicle during a retracted position and a closed position. That is, increased drag resulting when the vehicle roof is open increases the amount of work performed by the motor, thereby increasing the energy consumption of the vehicle. Accordingly, a driver may consider sacrificing energy consumption in exchange for driving the vehicle with the roof in a retracted, i.e. open, position.

The vehicle consumption module 106 may also include a safety determination unit that determines one or more safety conditions of the vehicle. The at least one safety condition includes, for example, road conditions, weather conditions, and a distance between the vehicle and a nearest recharging station. For example, the vehicle consumption module 106 may determine the nearest battery recharging station based on GPS data. Battery recharging stations may be input by the driver, such as a recharging station known to exist at home or at work, or may be determined according to GPS data. Based on the energy consumption of the vehicle, the vehicle consumption module 106 may determine whether the vehicle is capable of safely completing a trip without exhausting battery power. Moreover, the vehicle consumption module 106 may determine one or more vehicle sub-systems that may be inhibited to ensure the vehicle safely arrives at the nearest battery charging station. For example, the vehicle consumption module 106 may determine that a vehicle with a low battery power may arrive at battery recharging station without running out of battery power if the driver inhibits use of the HVAC system.

The battery system 100 further includes a battery capacity advisor module 112 in electrical communication with the driver behavior module 104 and the vehicle consumption module 106. The battery capacity advisor module 112 may determine a replacement battery option that changes at least one battery characteristic among the first set of battery characteristics based on the driver behavior model and the vehicle consumption model. The replacement battery option includes at least one of a replacement battery to replace the on-board battery 107 and/or a modification of battery layers of the on-board battery 107. The replacement battery option changes at least one battery characteristic among the set of battery characteristics of the on-board battery. In at least one embodiment, for example, the replacement battery and/or the modification of battery layers increases the specific energy initially provided by the on-board battery 107. Accordingly, the battery capacity advisory module 112 may recommend an optimal battery option that provides the most efficient specific energy realized by the vehicle. Although an example of optimizing the specific energy is previously mentioned, it is appreciated that the battery capacity advisory module 112 may recommend an optimal battery option that optimizes at least one of the cost, weight, power, operating range and operating time of the battery.

The battery system 100 may also include a user interface (UI) 114 that receives one or more inputs from a user. The driver inputs include, but are not limited to, locations of battery recharging stations and driving preferences. The driving preferences include desired average speeds, desired use of vehicle sub-systems, convertible top modes, and desired driving routes. Accordingly, the battery capacity advisor module 112 may also determine the replacement battery option based on one or more inputs from the driver via the UI 114. For example, the driver may input a desire to have a particular speed range available at all times. The battery capacity advisor module 112 may then determine the battery option that optimizes at least one of the battery cost, battery weight, driving range and operating time, while still providing the driver with the desired speed range.

The driver inputs may also be stored according to one or more driver profiles. A driver profile may then be entered via the UI 114, and the stored inputs may be retrieved at a future time. Accordingly, the battery capacity advisor module 112 may provide different battery replacement options based on input user profile, i.e., the driver currently operating the vehicle. One or more driver profiles may be stored, and may be updated each time a driver operates a vehicle under their corresponding driving profile. That is, the driver behavior modeller module may store a previous driver profile generated according to a previous driving event, and may update the previous driver profile with a new driver profile based on a new driving event. The updated profile includes updating a portion of the previous driver profile with new data, or replacing the previous driver with a completely new driver profile.

The UI 114 is configured to receive at least one input from the driver and/or to output an alert indicating one or more recommended replacement battery options. The UI 114 may include a graphical user interface (GUI). The alert includes, but is not limited to, at least one of a sound, text describing one or more replacement battery options, and an image of the replacement battery option. The driver may consider one or more replacement battery options via the GUI. The GUI may also alert the driver to a nearby charging station, or may alert the driver that a current driving behavior may consume the remaining available power of the battery before the driver is capable of reaching the nearest charging station. Accordingly, the driver may adjust the current driving behavior in real time to ensure the next nearest charging station is safely reached.

The UI 114 may further include a communication module to transmit the replacement battery option to a data server and/or a terminal device. The communication module may also allow the UI 114 to receive replacement battery options and/or user inputs from the terminal device. The data server may include a data server operated by a charging stations and/or a cloud server, for example, that stores one or more battery replacement options retrievable by the battery capacity advisor module 112. The terminal device may include, but is not limited to, a cell phone, a personal computer (PC), a laptop computer and a tablet computer.

Figure 2:
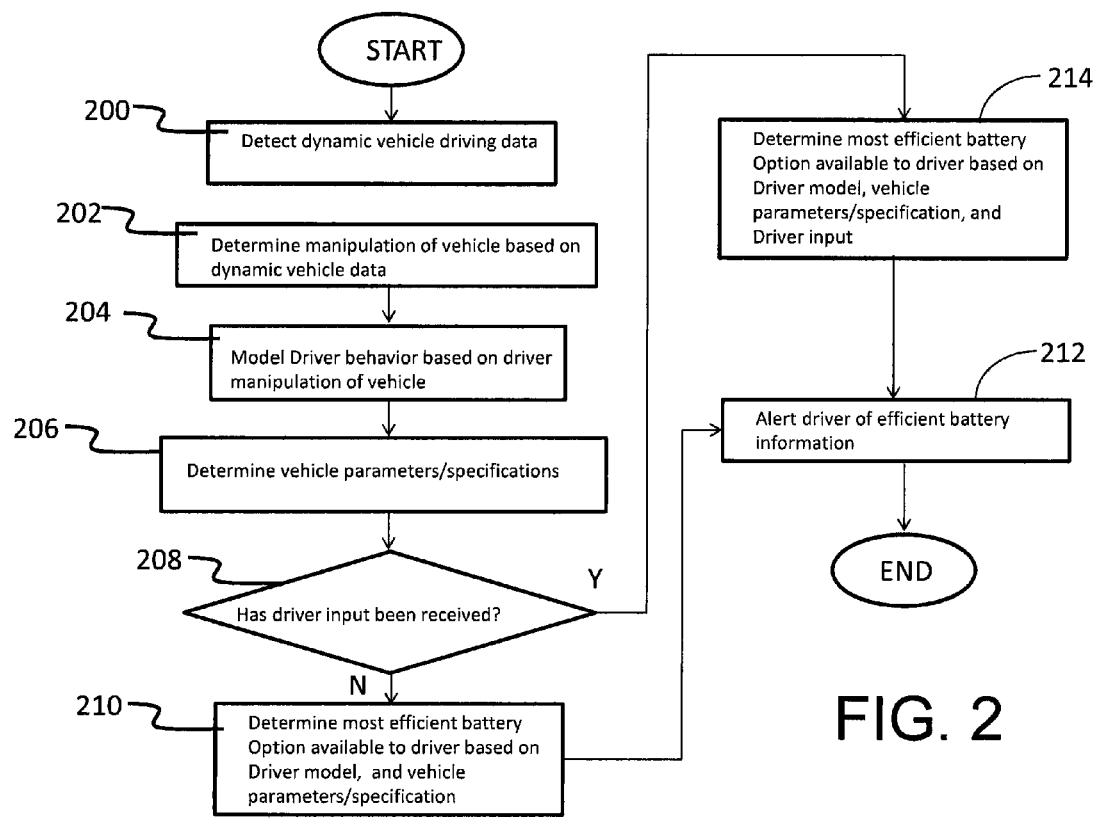
FIG. 2 is a flow diagram illustrating a method of determining an optimal battery to power an electric vehicle according to an embodiment.

Referring now to FIG. 2, a flow diagram illustrates a method of determining an optimal battery to power an electric vehicle according to an embodiment. At operation 200, dynamic vehicle driving data is detected. The dynamic vehicle driving data includes, for example, a speed of the vehicle based on a driver's manipulation of the vehicle accelerator pedal, or vehicle braking events based on a driver's manipulation of the brake pedal. At operation 202, the driver's manipulation of the vehicle is determined. For example, the number of braking events and/or the number of accelerations the driver inputs during a driving trip may be determined. At operation 204, a driving behavior of the driver is modeled based on the driver's manipulation of the vehicle. At operation 206, specifications and/or parameters of the vehicle are determined. The specifications and/or parameters include, but are not limited to, energy consumption of the vehicle motor, and energy consumption resulting from use of various vehicle sub-systems. The sub-systems include the HVAC system, the radio/media system, the wireless communication system, and the windshield wiper system. The vehicle and/or parameters may also include determining current battery information of the on-board battery currently installed on the vehicle. The battery information may include the battery type, power information, such as voltage and current output values, max power values, etc.

A determination as to whether the driver has input one or more driver inputs is performed at operation 208. If no driver input is received, the most efficient battery option based on the driver behavior model and the vehicle specifications and/or parameters is determined at operation 210. The most efficient battery option may include, for example, a replacement battery that provides the driver with an increased specific energy. That is, a replacement battery may be determined that is lighter than the on-board battery currently installed on the vehicle, but still provides power sufficient for the driver's driving needs. The lighter battery, therefore, will result in less overall energy consumption, and may result in a more efficient and optimal battery. At operation 212, the driver is alerted of one or more the optimal battery options and the method ends. Accordingly, the driver may decide whether to replace the current on-board battery with one or more battery options alerted by the UI.

However, if a driver input is received, the most efficient battery option may be determined based on the driver behavior model, the vehicle specifications and/or parameters, and the driver input at operation 214. The driver input may be input via a UI, for example, and may include desired driving characteristics, desired use of vehicle sub-systems during a driving trip, and/or driver profiles corresponding to one or more stored driving behaviors of a particular driver. At operation 212, the driver is alerted of the battery option and the method ends. Accordingly, the most efficient battery may be recommended to the driver, while taking account the driver's desired driving behavior.

As described herein, a system and/or server, for example, the vehicle battery recommendation system 100, may be described in the general context of computer system executable instructions, such as program modules, being executed by an electronic computer system. Generally, program modules may include routines, programs, objects, components, logic, data structures, and so on that perform particular tasks or implement particular abstract data types. In addition, a computer system and/or server may be practiced in distributed cloud computing environments where tasks are performed by remote processing devices that are linked through a communications network. In a distributed cloud computing environment, program modules may be located in both local and remote computer system storage media including memory storage devices.

As will be further described above, memory may include at least one program product having one or more program modules that are configured to carry out the functions of embodiments of the invention.

Furthermore, programs, functions, applications and tasks may be implemented and executed by one or more having a set (at least one) of program modules. Program modules may include memory that stores, for example, an operating system, one or more application programs, other program modules, and program data. Each of the operating system, one or more application programs, other program modules, and program data or some combination thereof, may include an implementation of a networking environment. Accordingly, the program modules described herein may carry out the functions, applications, tasks, and/or methodologies of the various embodiments described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While various embodiments have been described, it will be understood that those skilled in the art, both now and in the future, may make various modifications and enhancements which fall within the scope of the claims which follow. These claims should be construed to maintain the proper protection for the invention first described.

The invention claimed is:

1. A method of optimizing a battery size of an electric vehicle, comprising:
   detecting a manipulation of the vehicle;
   determining a driving behavior of a driver of the vehicle based on the manipulation;
   determining at least one battery characteristic among a set of battery characteristics of an on-board battery currently connected to the vehicle;
   determining energy consumption of the vehicle; and
   determining a replacement battery option that changes the at least one battery characteristic based on the driver behavior and the vehicle consumption model.

2. The method of claim 1, wherein the determining a replacement battery option includes at least one of determining a replacement battery to replace the on-board battery and determining a modification of battery layers of the on-board battery, the set of battery characteristics comprising energy storage capacity, specific energy, weight, size, charging and discharging properties and temperature dependence of the on-board battery.

3. The method of claim 2, wherein the at least one of a replacement battery and a modification of battery layers increases the first specific energy.

4. The method of claim 3, further comprising:
   determining dynamic vehicle data in response to real time manipulation of the vehicle by the driver;
   storing the dynamic vehicle data; and
   generating a numerical model indicating a driving behavior of the driver and at least one driving preference of the driver.

5. The method of claim 4, wherein the dynamic vehicle data includes vehicle speed, vehicle acceleration, vehicle breaking, driving distance, and driving duration.

6. The method of claim 5, wherein the energy consumption model is based on predetermined specifications of the vehicle and the dynamic vehicle data.

7. The method of claim 6, further comprising determining at least one safety condition of the vehicle, the at least one safety condition including a distance between the vehicle and a nearest recharging station.

8. The method of claim 7, receiving at least one driver input and outputting at east one alert indicating the replacement battery option.

9. The method of claim 8, further comprising determining the replacement battery based on an input from the drover.

10. The method of claim 9, wherein the alert includes at least one of a sound, text describing the replacement battery option, and an image of the replacement battery option.

11. The method of claim 8, further comprising wirelessly communicating the replacement battery option with a terminal device, the terminal device including at least one of a cell phone, a personal computer, a laptop computer and a tablet computer.

12. The method of claim 11, further comprising receiving a driver profile input from the user interface and determining the replacement battery option based on the driver profile.

13. A method of optimizing an on-board battery of a vehicle, comprising:
   receiving at least one driver profile corresponding to a driver of the vehicle;
   determining dynamic vehicle data in response to operation of the vehicle according to the driver;
   storing the dynamic vehicle data corresponding to the driver profile;
   determining energy consumption of the vehicle; and
   determining a replacement battery option that modifies at least one battery characteristic among a set of battery characteristics of the on-board battery based on the dynamic vehicle data of the input driver profile and the energy consumption of the vehicle.

14. The method of claim 13, wherein the battery capacity module determines the replacement battery in response to inputting the current driver profile among a plurality of driver profiles stored by the driver behavior module.

15. The method of claim 14, wherein the determining a replacement battery option includes at least one of determining a replacement battery to replace the on-board battery and determining a modification of battery layers of the on-board battery, the set of battery characteristics comprising energy storage capacity, specific energy, weight, size, charging and discharging properties and temperature dependence of the on-board battery.

16. The method of claim 15, wherein the at least one of a replacement battery and a modification of battery layers increases a specific energy realized by the vehicle.

17. The method of claim 16, wherein the driver behavior module comprises:
   Determining dynamic vehicle data in response to real time manipulation of the vehicle by the driver; and
   generating a numerical model of the driving behavior corresponding to the current driver profile.

18. The method of claim 17, further comprising storing a previous driver profile generated according to a previous driving event, and updating the previous driver profile based on a new driving event.

* * * * *